(12) United States Patent
Schräbler et al.

(10) Patent No.: US 9,123,993 B2
(45) Date of Patent: Sep. 1, 2015

(54) VEHICLE ANTENNA APPARATUS WITH A HORIZONTAL MAIN BEAM DIRECTION

(75) Inventors: Sighard Schräbler, Karben (DE); Sebastian Strunck, Niedernhausen (DE); Andreas Schirling, Darmstadt (DE); Michael Stämmler, Bensheim (DE); Marc Menzel, Weimar/Lahn (DE)

(73) Assignee: Continental Teves AG & Co. oHG (DE)

( * ) Notice: Subject to any disclaimer, the term of this patent is extended or adjusted under 35 U.S.C. 154(b) by 82 days.

(21) Appl. No.: 13/554,320

(22) Filed: Jul. 20, 2012

(65) Prior Publication Data

US 2013/0178170 A1  Jul. 11, 2013

Related U.S. Application Data

(63) Continuation of application No. 13/375,300, filed as application No. PCT/EP2010/057498 on May 28, 2010, now abandoned.

(51) Int. Cl.
| | | |
|---|---|---|
| *H04B 1/00* | (2006.01) | |
| *H04B 15/00* | (2006.01) | |
| *H01Q 1/32* | (2006.01) | |
| *H01Q 19/10* | (2006.01) | |
| *H01Q 19/185* | (2006.01) | |
| *H01Q 13/04* | (2006.01) | |
| *H04B 1/38* | (2015.01) | |

(52) U.S. Cl.
CPC ............ *H01Q 1/3275* (2013.01); *H01Q 13/04* (2013.01); *H01Q 19/104* (2013.01); *H01Q 19/108* (2013.01); *H01Q 19/185* (2013.01); *H04B 1/38* (2013.01)

(58) Field of Classification Search
USPC ............ 343/713, 818, 834–837; 455/63.4, 73
See application file for complete search history.

(56) References Cited

U.S. PATENT DOCUMENTS

| | | | | |
|---|---|---|---|---|
| 2,532,551 | A | | 12/1950 | Jarvis |
| 3,864,686 | A | * | 2/1975 | Owen ........................... 343/713 |
| 4,978,965 | A | * | 12/1990 | Mohuchy ...................... 343/727 |
| 5,534,880 | A | * | 7/1996 | Button et al. .................. 343/774 |
| 5,600,340 | A | | 2/1997 | Ho |
| 7,456,799 | B1 | * | 11/2008 | Cohen ........................... 343/773 |
| 2003/0016185 | A1 | * | 1/2003 | Morooka et al. .............. 343/895 |

(Continued)

FOREIGN PATENT DOCUMENTS

| | | |
|---|---|---|
| CN | 101005159 | 7/2007 |
| CN | 101427487 | 5/2009 |

(Continued)

OTHER PUBLICATIONS

International Application No. PCT/EP2010/057498, International Search Report mailed Jul. 26, 2010, 6 pgs.
Chinese Office Action corresponding CN 201080024561.5, dated Sep. 4, 2013 (Chinese Only).

*Primary Examiner* — Ayodeji Ayotunde
(74) *Attorney, Agent, or Firm* — RatnerPrestia (57) ABSTRACT

According to one exemplary embodiment of the invention, a vehicle antenna apparatus is provided on a vehicle in such a way that this results in the antenna having a horizontal main beam direction. A first reflection apparatus above the conductive roof of the vehicle, with an exciter between these two elements, causes the reflections to be doubled, thus causing the main beam direction to be lowered from a vertical to a horizontal direction.

15 Claims, 3 Drawing Sheets

(56) References Cited

U.S. PATENT DOCUMENTS

2005/0146478 A1* 7/2005 Wang et al. .................... 343/771
2006/0044177 A1* 3/2006 Wittenberg et al. ......... 342/25 A
2007/0001924 A1* 1/2007 Hirabayashi .................. 343/893
2007/0241980 A1 10/2007 Smith
2007/0247388 A1 10/2007 Asakura et al.

FOREIGN PATENT DOCUMENTS

| CN | 103000987 | 3/2013 |
| GB | 2165097 A | 4/1986 |
| JP | 2008-199407 | 8/2008 |
| WO | WO-2008155219 A1 | 12/2008 |

* cited by examiner

Fig. 1

PRIOR ART

VEHICLE ANTENNA APPARATUS WITH A HORIZONTAL MAIN BEAM DIRECTION

CROSS REFERENCE TO RELATED APPLICATIONS

This application is Continuation Application of U.S. Application Ser. No. 13/375,300, filed Nov. 30, 2011, which is the U.S. National Phase Application of PCT International Application No. PCT/EP2010/057498, filed May 28, 2010, which claims priority to German Patent Application No. 10 2009 026 694.1, filed Jun. 3, 2009, and German Patent Application No. 10 2010 028 881.0, filed May 11, 2010, the contents of such applications being incorporated by reference herein.

FIELD OF THE INVENTION

The invention relates to vehicle communication by means of antennas. In particular, the invention relates to a vehicle antenna apparatus, to a vehicle antenna module, to a vehicle, to the use of a vehicle antenna apparatus and to a method for transmission or reception of electromagnetic signals.

BACKGROUND OF THE INVENTION

Vehicle-to-vehicle communication (Car-to-Car communication, C2C) is the direct interchange of information between moving vehicles. Functional radio networks and new applications can be implemented by this mobile communication. This includes timely information about road and traffic conditions, such as black ice, aquaplaning, accidents or stationary vehicles. In this safety-relevant application, the appropriate vehicle sends the indication of the hazard location together, for example, with the data from the navigation system. Further information relating to the traffic flow may be information about traffic-light phases, stop-and-go journeys or stationary approach to and stopping at road works. Such vehicle-to-vehicle communication may also include searching for car parks, and information about free car-park capacities.

Furthermore, vehicle-to-X communication (car-to-X communication, C2X) is also known as direct interchange of the information between a moving vehicle and a further subscriber, for example an infrastructure. By way of example, this allows telephone data, WLAN uses or UMTS signals to be transmitted from the vehicle, or else to the vehicle. Furthermore, in present-day traffic, the connection between the vehicle and satellites is playing an increasingly more important role for user navigation. In this case, the communication subscribers who are connected to the vehicle for communication reside at widely different locations.

SUMMARY OF THE INVENTION

The invention aims to improve the communication capability of vehicles.

A vehicle antenna apparatus, a vehicle antenna module, a vehicle, the use of a vehicle antenna apparatus and a method for transmission or reception of electromagnetic signals are specified according to the features of the independent patent claims. Developments and further advantages of the invention are specified in the dependent claims.

The described exemplary embodiments relate equally to the vehicle antenna apparatus, to the local antenna module, to the vehicle, to the use of a vehicle antenna apparatus in a vehicle, and to the method. In other words, features which are described in the following text with respect to the vehicle antenna apparatus, for example, can also be implemented as features of the vehicle antenna module, of the vehicle and of the method, and vice versa.

According to one exemplary embodiment of the invention, a vehicle antenna apparatus is specified for transmission or reception of electromagnetic signals at a first frequency. In this case, the vehicle antenna apparatus has an exciter for production or for reception of the electromagnetic signals and a first reflection apparatus. In this case, the first reflection apparatus is designed for reflection of the electromagnetic signals to be transmitted or of the electromagnetic signals to be received and for simultaneous lowering of a main beam direction of the apparatus in the horizontal direction.

The reflection characteristic of the reflection apparatus can be referred to in this and in every other exemplary embodiment as a focusing characteristic as well, which is used for beamforming. In other words, the first reflection apparatus is designed for focusing the electromagnetic signals to be transmitted and the electromagnetic signals to be received, and for beamforming.

The reflection apparatus in the vehicle antenna apparatus therefore results in the electromagnetic signals to be transmitted and/or the electromagnetic signals to be received being reflected twice.

In other words, the first reflection apparatus is arranged on the vehicle such that the main beam direction of the vehicle antenna apparatus is lowered in the desired manner in the horizontal direction, in combination with, for example, the vehicle roof and its reflections of the electromagnetic signals.

The term "roof of the vehicle" or "vehicle roof" may be regarded within the context of the invention as any further electrically conductive, outer surface of the vehicle.

For example, the term "roof of the vehicle" can also be replaced by other surfaces, such as the trunk area, the engine hood, the floor, or a side surface of the vehicle.

The main beam direction of the vehicle antenna apparatus is therefore lowered further from a direction facing the sky to a direction which is as parallel to the vehicle roof as possible, because of the presence of the first reflection apparatus.

The vehicle antenna apparatus makes it possible, for example, for the transmitted signals from the vehicle antenna apparatus to reach a greater number of communication points of an infrastructure, since the main beam direction of the vehicle antenna apparatus now no longer points in the direction of the sky. The main portion of the emitted energy from the vehicle antenna apparatus is therefore emitted in the correct direction.

This advantage likewise comes to bear when the vehicle antenna apparatus is receiving electromagnetic signals.

For example, if the exciter is arranged between a vehicle surface such as a vehicle roof and the first reflection apparatus, then the invention results in the reflections being doubled, thus achieving the desired lowering of the main beam direction of the vehicle antenna apparatus in the horizontal direction.

In this case, in this and in every other exemplary embodiment of the invention, the first reflection apparatus as well as further reflection apparatuses as well, may be manufactured from electrically conductive material. In this case, it is likewise possible for these reflection apparatuses to be composed entirely or else partially of electrically conductive material.

The vehicle antenna apparatus may likewise be in the form of a single-component part, which is fitted as a complete part, for example, to a conductive vehicle surface. Alternatively, an embodiment in the form of a plurality of parts is also possible. By way of example, the exciter and the first reflection apparatus are physically separate.

In this and every exemplary embodiment of the invention, the term "frequency" can likewise mean a single frequency or else a frequency range. In other words, if desired, the vehicle antenna apparatus can transmit or else receive a broad frequency spectrum. Furthermore, the vehicle antenna apparatus can be physically optimized for a desired main frequency, for example by the distance between the first reflection apparatus in the installed position and the roof of the vehicle, or a second reflection apparatus.

On the one hand, the vehicle antenna apparatus makes it possible to achieve an antenna gain. For example, the directivity may be about 1.5 to 2-times higher than that of a simple dipole. Since the main beam direction is also adapted and the vehicle antenna apparatus can be used for transmission and reception, this example may result in the advantage of a factor of 4 to 10 over a simple rod antenna.

Furthermore, by way of example, the distance between the reflection apparatus and a second reflecting surface of the vehicle can be adapted such that the lowest frequency which it is still desired to transmit and receive, or half of the wavelength corresponding thereto, is just matched to the distance between this reflection apparatus and the conductive vehicle surface.

Furthermore, it is possible for the horizontal extent of the reflection apparatus to correspond at least to one wavelength of an electromagnetic wave to be transmitted or to be received. This electromagnetic wave corresponds to the electromagnetic signals to be transmitted or to be received.

However, in this and every other exemplary embodiment, it is possible, if desired, to fit the vehicle antenna apparatus to further surfaces on the vehicle and to achieve the desired effect as described above and below of lowering the alignment of the main beam direction of the vehicle antenna toward further vehicles or other communication subscribers.

In other words, this results in an antenna having a virtually horizontal main beam direction, as a result of which electromagnetic signals can be emitted and received in the desired direction, the antenna has a higher gain, and this can also be achieved for a broad frequency range.

This exemplary embodiment of the invention allows the main beam direction to be lowered from a vertical to a horizontal beam characteristic, by additional reflection on the first reflection apparatus.

In this and every other exemplary embodiment, the electromagnetic signals may be transmitted both wirelessly and by wire within the vehicle. For example, this can be done by Bluetooth, USB, WLAN or else by using transmission techniques and transmission media.

In this case, the term "vehicle" should be understood in the overall context of the invention as, for example, a car, a bus or a goods vehicle, or else a rail vehicle, a marine vessel, an aircraft, such as a helicopter or airplane, or, for example, a bicycle.

According to a further exemplary embodiment of the invention, the exciter is in the form of an omnidirectional antenna element having a 360° beam characteristic about the vehicle vertical axis.

In other words, it is therefore possible to achieve, or if desired approximate to the vehicle antenna apparatus having a rotationally symmetrical emission and reception profile about the vehicle.

Because of the doubling of the reflections which are achieved by the first reflection apparatus and a reflective surface, corresponding thereto, of the vehicle, or else by a second reflection apparatus, this results in a form of lighthouse for the radiation to be transmitted and to be received, which lighthouse can cover the entire horizon around the vehicle, and receives from there, at the same time.

A further antenna gain and increased directivity in comparison to previous rod antennas in vehicles can therefore be achieved, thus making it possible to improve the access to the subscriber in the vehicle. This may also correspond to an increased safety gain, where critical traffic situations occur.

According to a further exemplary embodiment of the invention, the first reflection apparatus is arranged above a roof of the vehicle, and the exciter is arranged between the roof and the first reflection apparatus.

According to this exemplary embodiment, which is described by way of example in FIG. 2 below, the reflections are doubled by the electrically conductive first reflection apparatus above the exciter, in combination with the reflection on the roof of the vehicle.

According to a further exemplary embodiment of the invention, the first reflection apparatus is in the form of a surface, and the first reflection apparatus is arranged parallel to the roof of the vehicle.

Figure 2:
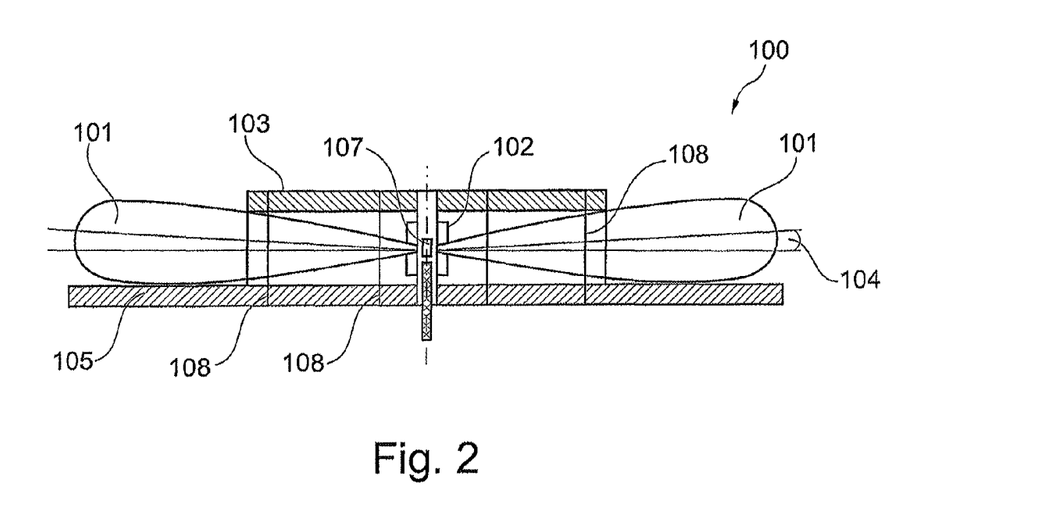
FIG. 2 shows a vehicle antenna apparatus according to one exemplary embodiment of the invention.
Figure 3:
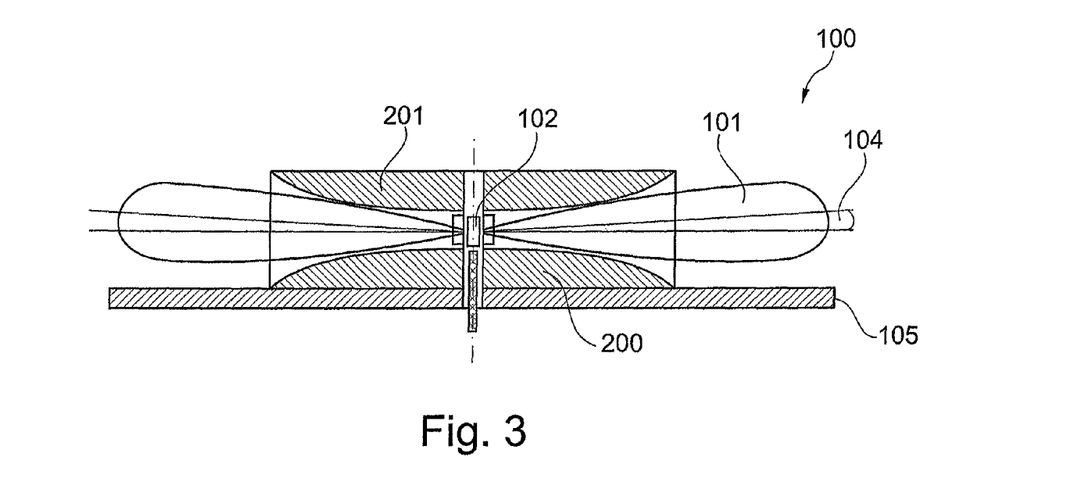
FIG. 3 shows a vehicle antenna apparatus according to one exemplary embodiment of the invention.

As can be seen from the two exemplary embodiments of the vehicle antenna apparatus in FIGS. 2 and 3, the reflection apparatuses are, in particular, arranged parallel to the roof of the vehicle. In this case, the size of the reflection apparatus may correspond to the surface of the roof, or else it may be smaller or larger.

This makes it possible to transmit or receive the desired electromagnetic signals parallel to the roof of the vehicle, and on this plane. This applies to all the exemplary embodiments of the invention.

According to a further exemplary embodiment of the invention, the exciter is in the form of a dipole exciter and the dipole exciter is in a toroidal shape about a non-conductive cylinder.

In this case, by way of example, the exciter may be in the form of a center-fed dipole. There is therefore a plane of symmetry at the center of the antenna. Furthermore, the cylinder may be part of this exemplary embodiment. Furthermore, the cylinder may be designed such that a so-called balun transformer fits into the cylinder. This balun transformer may also be arranged in this cylinder, in a further exemplary embodiment.

According to a further exemplary embodiment of the invention, the vehicle antenna apparatus furthermore has a balun transformer, wherein the balun transformer is designed for matching an asymmetric signal on a feed line to the exciter to a ground-symmetrical dipole, wherein the balun transformer is arranged within the exciter.

This makes it possible to adjust the desired directional characteristics since, according to this exemplary embodiment, matching is carried out to the symmetrical antenna.

According to a further exemplary embodiment of the invention, the vehicle antenna apparatus furthermore has a connection element with a first and a second end, wherein the connection element runs vertically between the first reflection apparatus and the roof of the vehicle. Furthermore, the first end of the connection element is connected to the roof of the vehicle, and the second end of the connection element is connected to the reflection apparatus.

By way of example, the connection elements may be in the form of electrically conductive rods, which may have widely differing shapes. Furthermore, the conductive rods may, for example, electrically connect the roof of the vehicle as a lower ground to the first reflection apparatus as an upper ground. This is illustrated and described, by way of example, in the following FIG. 2.

This configuration of the antenna asymmetrically with respect to ground may have particular advantages. For example, a small physical height can be achieved, or else simplified matching is achieved in this way. In this case, the roof of the vehicle is in the form of part of the dipole, and is not only a reflector.

Furthermore, it is possible for these connection elements to be in the form of load-bearing structural parts of the vehicle antenna apparatus such that, for example, the first reflection apparatus, if desired, could be made more massive. It is thus likewise possible, for example, to dispense with a mechanical support in the central area of the first reflection apparatus where, for example, the feed line to the exciter may run. This feed line profile is illustrated by way of example in FIG. 2. In other words, the areas in which the electromagnetic signals are supplied to the antenna apparatus could thereby remain free of structurally supporting parts.

According to a further exemplary embodiment of the invention, the vehicle antenna apparatus furthermore has a second antenna apparatus for transmission or reception of electromagnetic signals at a second frequency. In this case, the second antenna apparatus is arranged above the first reflection apparatus.

In other words, a vehicle antenna apparatus according to one of the preceding exemplary embodiments is therefore described, in which, however, a GPS transmitter and/or receiver is now, however, additionally arranged above the first reflection apparatus, for example as a second antenna apparatus. In other words, the idea according to aspects of the invention of doubling the reflections is combined with a further antenna for a second frequency range, by means of which transmission or reception is intended to be carried out in the normal manner, that is to say by way of example particularly in the direction of the sky.

In this case, in this exemplary embodiment and in every other exemplary embodiment, the term "frequency" means both a single electromagnetic frequency and a frequency spectrum with a greater or lesser width.

By way of example, in this exemplary embodiment and in every other exemplary embodiment, the lowering of the main beam direction by means of the first reflection apparatus can be used for C2C or C2X communication.

In contrast, according to this exemplary embodiment the second antenna apparatus can produce a second data link for example to GPS satellites, which second data link is not intended to be lowered in the horizontal direction.

According to a further exemplary embodiment of the invention, the first reflection apparatus is arranged at a distance from the roof of the vehicle, which distance corresponds at least to half the wavelength of the electromagnetic signals to be transmitted or to be received.

In other words, the first reflection apparatus and the roof of the vehicle, which both represent electroconductive surfaces, form a type of cavity in which the electromagnetic signals are reflected. According to aspects of the invention, the distance between these two surfaces can now be chosen such that, for example, a multiple of half the wavelength of a desired electromagnetic frequency fits vertically in this range.

This may, of course, also be designed in this way for a plurality of electromagnetic frequencies.

According to a further exemplary embodiment of the invention, the vehicle antenna apparatus furthermore has a second reflection apparatus, wherein the second reflection apparatus is arranged between the roof of the vehicle and the exciter.

In other words, both the first and the second reflection apparatuses are used for the lowering according to aspects of the invention of the main beam direction of the apparatus as a result of doubling of the reflections. In other words, according to this exemplary embodiment, the apparatus is now no longer based on the reflective characteristics of the vehicle roof or some other reflective surface of the vehicle, but can achieve the lowering of the main beam direction in the horizontal direction, independently thereof.

In this case, this vehicle antenna apparatus can also be manufactured as a single part and therefore as one component, and can be placed at the desired point on the vehicle, although a multi-component version of this exemplary embodiment is also possible.

In this case, all design features which have been described with respect to the first reflection apparatus also apply to the second reflection apparatus.

According to a further exemplary embodiment of the invention, a vehicle antenna module is specified for transmission and reception of electromagnetic signals at a first and a second frequency. The vehicle antenna module has a first vehicle antenna apparatus with a first exciter for production and for reception of electromagnetic signals at the first frequency, and a first reflection apparatus. In this case, the first reflection apparatus is designed for reflection of the electromagnetic signals to be transmitted and to be received at the first frequency and for simultaneous lowering of a main beam direction of the first exciter in the horizontal direction. Furthermore, the vehicle module has a second vehicle antenna apparatus with a second exciter for production and for reception of electromagnetic signals at the second frequency, and a second reflection apparatus, wherein the second reflection apparatus is designed for reflection of the electromagnetic signals to be transmitted and to be received at the second frequency, and for simultaneous lowering of a main beam direction of the second exciter in the horizontal direction.

In other words, the idea according to aspects of the invention of lowering the main beam direction by means of additional reflection apparatuses can be provided twice by this vehicle antenna module. In other words, this lowering of the respective main beam direction by respectively doubling the reflections can be achieved for two different frequencies or for two different frequency ranges.

Since the respective vehicle antenna apparatus can be optimally tuned to a specific frequency range, it is therefore possible, for example, to transmit and receive UMTS signals with an increased gain on the horizontal plane, for example via the first vehicle antenna apparatus, and, for example, to transmit and receive WLAN signals with an increased gain and in the horizontal direction, for example via the second vehicle antenna apparatus.

In this case, the applications mentioned above with specific frequency ranges are mentioned only by way of example, and other frequency ranges, transmission protocols and combinations thereof are also possible.

In this case, as already described, the vehicle roof can be used as a reflection surface for the vehicle antenna apparatus which is arranged below this location or else, as already described, a further reflection apparatus can likewise be used, in order not to be dependent on the reflection on the roof of the vehicle.

According to a further exemplary embodiment of the invention, the two vehicle antenna apparatuses of the vehicle antenna module are arranged above the roof of the vehicle and horizontally one above the other.

According to a further exemplary embodiment of the invention, a vehicle is specified having a vehicle antenna apparatus or a vehicle antenna module according to one of the previous exemplary embodiments.

According to a further exemplary embodiment of the invention, the use of a vehicle antenna apparatus in a vehicle is specified for C2X communication according to one of the preceding exemplary embodiments.

According to a further exemplary embodiment of the invention, a method is specified for transmission or reception of electromagnetic signals at a first frequency between a vehicle and a further subscriber, wherein the method has the following steps: production of an electromagnetic signal, emission of the electromagnetic signal between a roof of the vehicle and a reflection apparatus, reflection of the emitted electromagnetic signal both on the roof of the vehicle and on the reflection apparatus, thus resulting in lowering of the main beam direction.

It should be noted that, within the overall context of the present invention, GPS is used as being representative for all global navigation satellite systems (GNSS), such as GPS, Galileo, GLONASS (Russia), COMPASS (China), and IRNSS (India).

Exemplary embodiments of the invention will be described in the following text with reference to the figures.

BRIEF DESCRIPTION OF THE FIGURES

The invention is best understood from the following detailed description when read in connection with the accompanying drawings. Included in the drawings is the following figures.

DETAILED DESCRIPTION OF THE PREFERRED EMBODIMENTS

The illustrations in the figures are schematic and are not to scale.

The same reference numbers are used for the same or similar elements in the following description of the figures.

Figure 1:
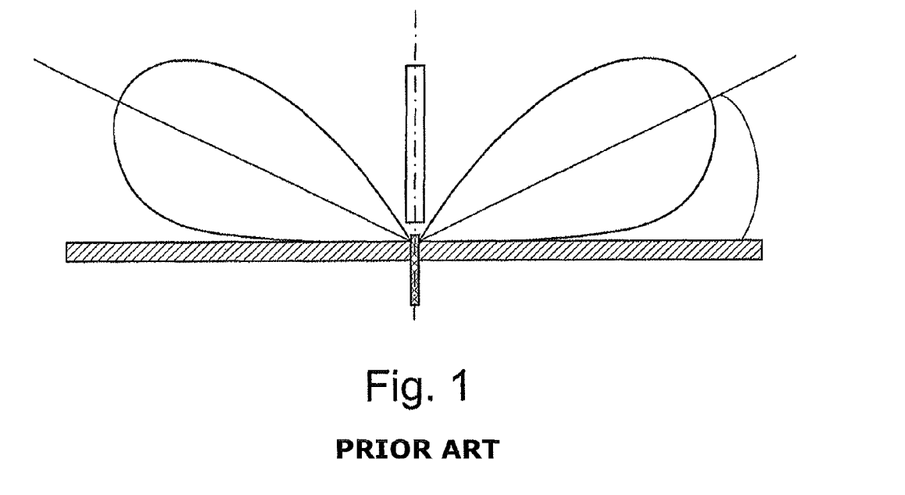
FIG. 1 shows a rod antenna on a surface, as technical background to the invention.

FIG. 1 shows a rod antenna which is arranged above a surface. Because of the reflection on the surface and on the conductive ground, the main beam direction of this rod antenna points in the direction of the sky. In this case, the surface represents the ground here.

FIG. 2 shows a vehicle antenna apparatus 100 for transmission or reception of electromagnetic signals 101 at a first frequency according to one exemplary embodiment of the invention. In this case, the vehicle antenna apparatus has an exciter 102 for production or for reception of the electromagnetic signals, and has a first reflection apparatus 103. In this case, the first reflection apparatus is designed for reflection of the electromagnetic signals to be transmitted or to be received and for simultaneous lowering of a main beam direction 104 of the apparatus in the horizontal direction. In this case, the horizontal direction corresponds to that direction which runs from right to left in the figure.

The reflection characteristic of the reflection apparatus can also be referred to in this and every other exemplary embodiment as a focusing characteristic, which is used for beam-forming. In other words, the first reflection apparatus is designed for focusing the electromagnetic signals to be transmitted or the electromagnetic signals to be received, and for beamforming.

The reflection apparatus in the vehicle antenna apparatus therefore results in the electromagnetic signals to be transmitted and/or the electromagnetic signals to be received being reflected twice.

In this exemplary embodiment, the reflection apparatus 103 is in the form of an electrically conductive surface parallel to the roof of the vehicle 105. Both the exciter and the first reflection apparatus are arranged above the roof. The exciter is located between the roof and the reflection apparatus. In this case, in this exemplary embodiment, the exciter is in the form of a dipole exciter 106.

Furthermore, a balun transformer 107 is shown, which, for example, can be designed for matching an asymmetric signal on a feed line to the exciter to a ground-symmetrical dipole. The balun transformer is arranged within the exciter, as is shown.

Furthermore it is possible for the balun transformer to be designed for transformation of a foot-point impedance of the illustrated vehicle antenna apparatus to an impedance of the feed line. Instead of the balun, it is also possible, for example, to use a bypass line.

Two transformations are (generally) required for matching an antenna to the feed line:

The transformation of the impedance, because the antenna foot-point impedance at the feed point may be greater than the cable impedance, but the waves should not be reflected at the junction (for example full dipole 124 ohms, cable 50 ohms). Some antennas in some cases even have considerably greater foot-point impedances (Vivaldi elements: 500 ohms).

It may also be desirable to get rid of the imaginary part of the foot-point impedance, because this results in losses.

There is then also the matching from asymmetric to symmetrical: both transformations can still be implemented by means of so-called balun transformers for frequencies below 10 GHz, while, above 100 MHz, if desired, it is also advantageous to use the bypass line and lambda/4 lines whose own impedance is sqrt($Z1*Z2$).

Furthermore, the vehicle antenna apparatus has a plurality of connection elements 108, which run between the first reflection apparatus and the roof of the vehicle.

This exemplary embodiment of the invention shown here makes it possible to double the reflections because of the electrically conductive surface 103. In this case, this exemplary embodiment of the invention is in the form of a symmetrical antenna. The connection elements 108 are in the form of conductive rods, which electrically connect the lower ground, the roof of the vehicle 105, and the upper ground, the first reflection apparatus 103. As can be seen from FIG. 2, the main beam direction 104 is virtually parallel to the roof surface 105 of the vehicle, and is therefore considerably lowered in the horizontal direction in comparison to the prior art example in FIG. 1.

In this case, the distance between the two plates, the first reflection apparatus 103 and the roof of the vehicle 105, may be λ/2 or multiples thereof. The intermediate space between the two plates could, for example, be filled with a dielectric, in order to make the vehicle antenna apparatus suitable for use in a washing installation and for weathering. In this case, the physical volume of the antenna is reduced, since the speed of light is correspondingly lower in the dielectric, which may be considered to be advantageous in terms of the size of the apparatus.

According to one estimate of the excess gain limit according to Harrington, an antenna can be enclosed in a spherical shell with the radius A. With the angular frequency ω and the speed of light C, the wavelength number is correspondingly K=ω/C. The directivity D has a defined maximum value Dmax=$(K*A)^2+2*K*A$. Assuming that, for example, λ/2=25.4 mm for F=5.9 GHz, the size of a Martins horn for the antenna results from this. Provided that excessive compromises do not have to be made in the design of the antenna and since this is a design which is in principle suitable for the frequency range, the excess gain limit is also approximately reached.

By way of example, the directivity may be approximately 1.5 to 2-times as great as that of a simple dipole. Since the main beam direction can also be adapted and the illustrated vehicle antenna apparatus in FIG. 2 can be used for transmission and reception, this results in an advantage of, for example, a factor of 4 over a simple rod antenna.

In this case, this illustrated vehicle antenna apparatus may not only be designed for a broad frequency range but may also be positioned at different points on the vehicle.

FIG. 3 shows a vehicle antenna apparatus 100 according to a further exemplary embodiment of the invention. In this case, this exemplary embodiment can be referred to as an omnidirectional horn antenna. This may be based on a Vivaldi antenna which is rotated about the axis of symmetry. This omnidirectional horn can achieve even greater focusing.

The input with the dipole, balun and, for example, a coaxial feed line may be designed in the same way as the already described variant in FIG. 1.

However, other technical embodiments of this vehicle antenna apparatus are also possible, with respect to the aspects of the exciter and the feed line.

As can also be seen from FIG. 3, this vehicle antenna apparatus results in the desired lowering of the main beam direction 104 of the apparatus in the horizontal direction.

Figure 4:
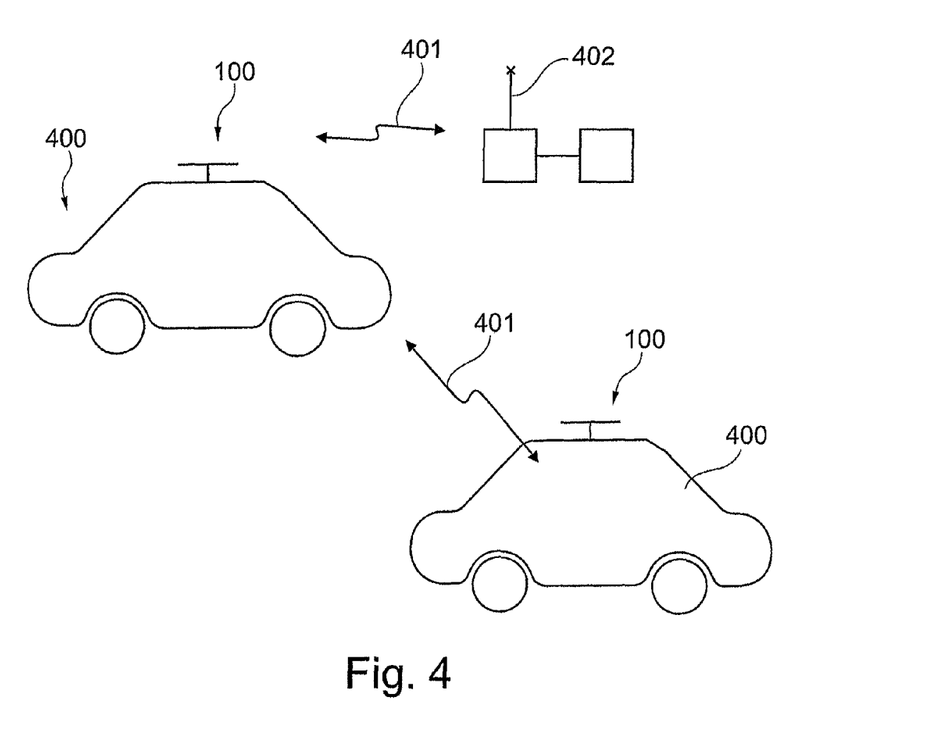
FIG. 4 shows vehicles with a vehicle antenna apparatus according to one exemplary embodiment of the invention.

FIG. 4 shows a perspective illustration of two vehicles 400 which are equipped with vehicle antenna apparatuses 100. So-called C2C communication can take place by means of a data link 401 between the two vehicles.

Because of the lowering according to aspects of the invention of the main beam direction of the vehicle antenna apparatuses in the horizontal direction, it is not only possible for a vehicle to transmit electromagnetic signals to a greater number of other vehicles, but also to receive a greater number of signals.

In the same way, an infrastructure 402 is shown which, for example, is intended to be used as a communication partner for C2X communication. A data link 401 is likewise set up between the upper left-hand vehicle 400 and the infrastructure 402, in which case the main beam direction has been lowered horizontally by means of the vehicle antenna apparatus 100 according to aspects of the invention, thus achieving a directional beam characteristic with an improved direction, and an increased antenna gain.

Figure 5:
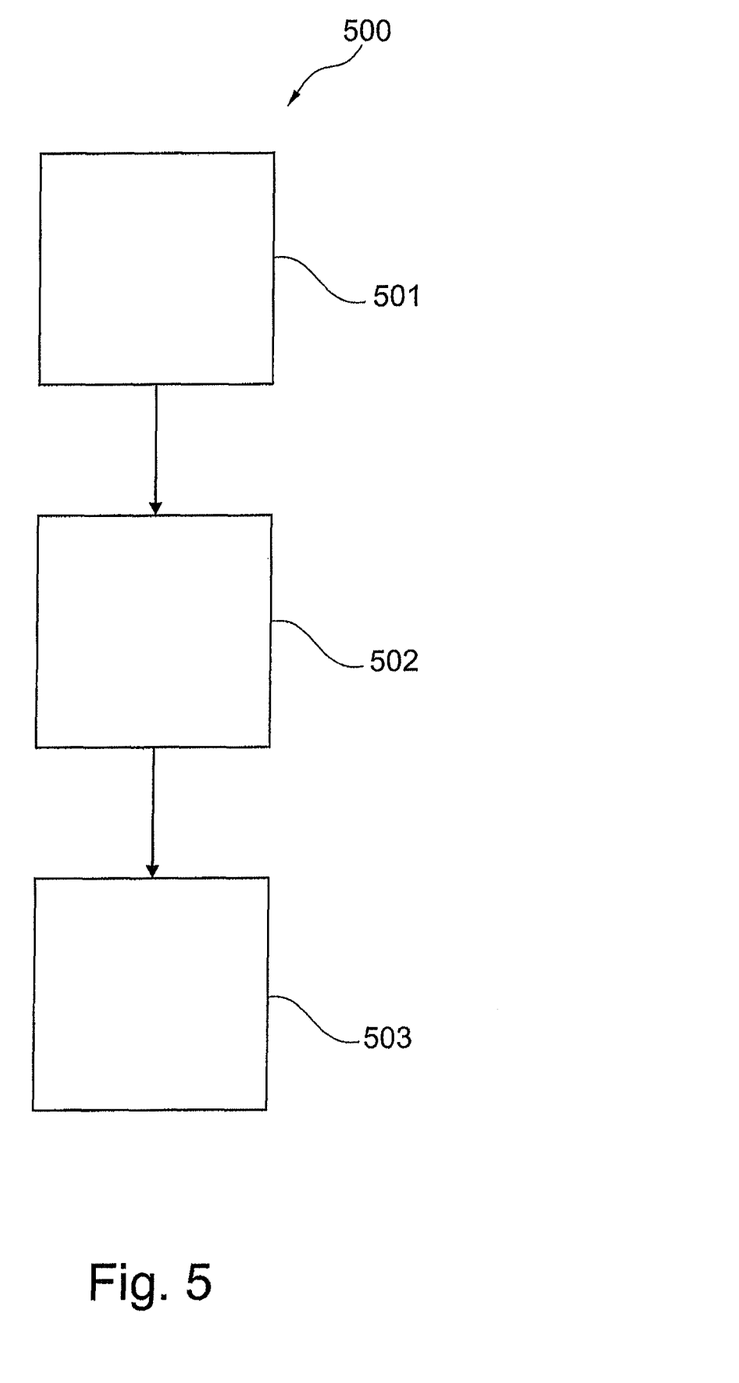
FIG. 5 shows a flowchart of a method according to one exemplary embodiment of the invention.

According to a further exemplary embodiment of the invention, FIG. 5 shows a flowchart 500 of a method which includes three steps. An electromagnetic signal is produced in step 501 and is then emitted in step 502 between a roof of the vehicle and a first reflection apparatus. The step 503 describes the reflection of the emitted electromagnetic signal both on the roof of the vehicle and on the first reflection apparatus, thus resulting in the main beam direction being lowered.

According to aspects of the invention, the reflections are in this case doubled which, when using a dipole exciter as in the example, which has a 360° omnidirectional beam characteristic, leads throughout the entire 360° area surrounding the vehicle to electromagnetic signals which are emitted virtually parallel to the horizon. This applies analogously to reception.

In addition, it should be noted that "comprising" and "having" do not preclude other elements or steps and "one" or "a" does not preclude a multiplicity. It should also be noted that features or steps which have been described with reference to one of the above exemplary embodiments can also be used in combination with other features or steps of other exemplary embodiments described above.

Furthermore, it should be explicitly noted that the method described above may be carried out in the stated sequence, but other sequences of said method steps are also possible.

What is claimed:

1. A vehicle antenna apparatus for transmission or reception of electromagnetic signals at a first frequency, comprising:
   a first reflection apparatus mounted on the vehicle parallel to a roof of the vehicle; and
   a radio frequency (RF) exciter for transmitting or receiving electromagnetic signals, the RF exciter being mounted between the first reflector and the roof of the vehicle, exclusive of a reflector in between the RF exciter and the roof of the vehicle;
   wherein the first reflector is arranged parallel with respect to the roof of the vehicle such that the electromagnetic signals transmitted by or received by the RF exciter are reflected by both the first reflection apparatus and the roof of the vehicle to guide the electromagnetic signals in a horizontal direction.

2. The vehicle antenna apparatus as claimed in claim 1, wherein the RF exciter is in the form of an omnidirectional antenna element having a 360° beam characteristic about a vehicle vertical axis.

3. The vehicle antenna apparatus as claimed in claim 1, wherein the first reflection apparatus is in the form of a surface, and
   wherein the first reflection apparatus is arranged parallel to a roof of the vehicle.

4. The vehicle antenna apparatus as claimed in claim 1, wherein the RF exciter is in the form of a dipole RF exciter, and
   wherein the dipole RF exciter is in a toroidal shape about a non-conductive cylinder.

5. The vehicle antenna apparatus as claimed in claim 1, further comprising:
   a balun transformer,
   wherein the balun transformer is designed for matching an asymmetric signal on a feed line to the RF exciter to a ground-symmetrical dipole, and
   wherein the balun transformer is arranged within the RF exciter.

6. The vehicle antenna apparatus as claimed in claim 1, further comprising:
   a connection element with a first and a second end,
   wherein the connection element runs vertically between the first reflection apparatus and a roof of the vehicle, and
   wherein the first end of the connection element is connected to the roof of the vehicle, and the second end is connected to the first reflection apparatus.

7. The vehicle antenna apparatus as claimed in claim 1, further comprising:
   a second antenna apparatus for transmission or reception of electromagnetic signals at a second frequency, and
   wherein the second antenna apparatus is arranged above the first reflection apparatus.

8. The vehicle antenna apparatus as claimed in claim 1, wherein the first reflection apparatus is arranged at a distance from a roof of the vehicle, which distance corresponds at least to half the wavelength of the electromagnetic signals to be transmitted or to be received.

9. The vehicle antenna apparatus as claimed in claim 1, further comprising:
a second reflection apparatus,
wherein the second reflection apparatus is arranged between the roof of the vehicle and the RF exciter.

10. A vehicle antenna module for transmission and reception of electromagnetic signals at a first and a second frequency, further comprising:
a first vehicle antenna apparatus with a first radio frequency (RF) exciter for production and for reception of electromagnetic signals at the first frequency;
a first reflection apparatus mounted on the vehicle parallel to a roof of the vehicle such that the first RF exciter is positioned in between the first reflection apparatus and the roof of the vehicle, the first reflection apparatus and the roof of the vehicle are designed to reflect the electromagnetic signals to be transmitted and to be received at the first frequency to guide the electromagnetic signals transmitted by or received by the first RF exciter in a horizontal direction;
a second vehicle antenna apparatus with a second RF exciter for production and for reception of electromagnetic signals at the second frequency; and
a second reflection apparatus mounted on the vehicle parallel to the roof of the vehicle such that the second RF exciter is positioned in between the second reflection apparatus and the roof of the vehicle,
wherein the second reflection apparatus and the roof of the vehicle are designed to reflect the electromagnetic signals to be transmitted and to be received at the second frequency to guide the electromagnetic signals transmitted or received by the second RF exciter in a horizontal direction.

11. The vehicle antenna module as claimed in claim 10, wherein the two vehicle antenna apparatuses are arranged above a roof of the vehicle and horizontally one above the other.

12. A vehicle having a vehicle antenna module as claimed in claim 10.

13. A vehicle having a vehicle antenna apparatus as claimed in claim 1.

14. The use of a vehicle antenna apparatus in a vehicle for C2X communication as claimed in claim 1.

15. A method for transmission or reception of electromagnetic signals at a first frequency between a vehicle and a further subscriber, the method comprising:
producing, by an RF exciter, an electromagnetic signal;
emitting, by the RF exciter, the electromagnetic signal between a roof of the vehicle and a first reflection apparatus mounted on the vehicle parallel to the roof of the vehicle, exclusive of a reflector in between the RF exciter and the roof of the vehicle; and
reflecting the emitted electromagnetic signal both on the roof of the vehicle and on the first reflection apparatus to guide the emitted electromagnetic signal in a horizontal direction.

* * * * *

UNITED STATES PATENT AND TRADEMARK OFFICE
CERTIFICATE OF CORRECTION

| | | |
|---|---|---|
| PATENT NO. | : 9,123,993 B2 | Page 1 of 1 |
| APPLICATION NO. | : 13/554320 | |
| DATED | : September 1, 2015 | |
| INVENTOR(S) | : Sighard Schräbler et al. | |

It is certified that error appears in the above-identified patent and that said Letters Patent is hereby corrected as shown below:

On the Title Page, item (30), Foreign Application Priority Data, please insert

--June 3, 2009   (DE) 10 2009 026 694.1
  May 11, 2010  (DE) 10 2010 028 881.0--

Signed and Sealed this
Nineteenth Day of January, 2016

Michelle K. Lee
*Director of the United States Patent and Trademark Office*